United States Patent

[11] 3,604,100

[72] Inventors John Basil Tindale
Reading;
James Henry Burgess, Silchester, both of, England
[21] Appl. No. 753,574
[22] Filed Aug. 19, 1968
[45] Patented Sept. 14, 1971
[73] Assignee United Kingdom Atomic Energy Authority
London, England
[32] Priority Sept. 6, 1967
[33] Great Britain
[31] 40820/67

[54] METHODS OF INSERTING RODS INTO A FRAME
5 Claims, 4 Drawing Figs.
[52] U.S. Cl. .................................................. 29/433,
29/241, 176/78
[51] Int. Cl. ..................................................... B23p 19/04
[50] Field of Search .......................................... 29/241,
433; 176/78 X, 32

[56] References Cited
UNITED STATES PATENTS
1,306,337 6/1919 Hayden ........................ 29/241
1,610,633 12/1926 Swanson ....................... 29/241
1,942,459 1/1934 Timmons ....................... 29/241
2,287,287 6/1942 Boltz ............................. 29/241
3,104,218 9/1963 Speidel et al. ................. 176/78
3,163,582 12/1964 Collins et al. ................. 176/32
3,341,930 9/1967 Belanger ....................... 29/433
3,513,532 5/1970 Lambert ........................ 29/433

Primary Examiner—Charlie T. Moon
Attorney—Larson, Taylor and Hinds

ABSTRACT: To insert a parallel array of nuclear fuel pins into a wrapper containing transverse grids for locating the pins, the wrapper is first filled with pilot rods of reduced diameter and having tapered leading ends to allow easy passage through the grids. Next the recessed rear ends of the pilot pins are engaged by the front ends of the fuel pins and the latter thrust into the wrapper so that they displace the pilot rods.

Successive rows of fuel pins are thrust into the wrapper by apparatus comprising a plurality of resiliently mounted, grooved roller pairs which locate a row of fuel pins between them, the rear ends of the pins being engaged by a thrust-head which passes between the rollers of each pair.

METHODS OF INSERTING RODS INTO A FRAME

BACKGROUND OF THE INVENTION

This invention relates to methods and apparatus for inserting a plurality of rods into a frame which includes grids for locating the rods to form a parallel array in the frame. It is particularly relevant where the rods are nuclear reactor fuel pins which are inserted into grid-containing wrappers, a plurality of the latter being subsequently assembled together to form a nuclear reactor core. Such arrangements are well known for fast reactor construction, and an example is described in Paper No. 7, BNES London Conference on Fast Breeder Reactors, May 1966, "Design and development of fuel and duel element for Prototype Fast Reactor," by J. F. W. Bishop et al.

The insertion of the fuel pins into the grid-containing wrapper presents difficulties. The pins are required to be a close fit in the cells of the locating grids, but their thin walls, e.g. of 15 thou stainless steel, must not be damaged during insertion, and it is therefore necessary that they be inserted with a controlled force. Moreover these pins may be 10 ft. long with a diameter of less than one fourth inch. It is difficult to make them absolutely straight and to ensure that they remain straight during handling and insertion. It is found in practice that there is a tendency for the leading ends of the pins to deviate from a straight path and either to enter the wrong cell or to strike the partitions between the cells.

The latter effect becomes a serious problem when, in order to reduce coolant pressure drop, grids of the type in which each grid locates each pin against movement in any direction are discarded in favour of grids having large cells through each of which pass several pins, location of any individual pin being effected by contact with several successive grids. Structures of this kind are shown, for example, in Paper P/2196 of the 1958 Geneva Conference on the Peaceful Uses of Atomic Energy, Vol. 6, at pages 649–650, in which the successive grids are combined to form multistory grids.

In a modified form of the wrapper assembly shown in the above BNES paper No. 7, approximately half the length of each pin (the fuel-containing portion) is located in honeycomb grids of the type shown in British Pat. No. 992,154 spaced 4 inches apart. The remainder of each pin (the plenum for accommodation of fission-product gases) is supported by abutting grids having large parallelogram-shaped cells, successive grids being oriented in such a manner that location of each pin is effected by contact with a number of such grids. A pin may require to pass through up to 12 grids to be located against movement in any direction, and as the grids are 1 inch deep, complete restraint may thus involve a 12 inch length of wrapper. It is apparent that with such infrequent location of the pins, insertion in their correct positions is difficult to achieve. The problem is complicated by the fact that the pins are highly radioactive by reason of the nuclear fuel contained therein, so that the insertion must be done by remote control behind shielding.

It is one object of the present invention to provide a method and apparatus which reduces the above difficulties.

SUMMARY OF THE INVENTION

According to the present invention a method of inserting a plurality of rods into a frame which includes grids for locating rods to form a parallel array thereof, comprises firstly inserting into said frame a corresponding plurality of pilot rods, each pilot rod having a reduced cross-sectional dimension relative to said first-mentioned rods to allow easy passage through said grids and having a rear end adapted to engage the front end of a said first-mentioned rod, and secondly engaging the rear ends of said plot rods with the front ends of said first-mentioned rods and thrusting said first-mentioned rods into the frame so that each first-mentioned rod displaces a said pilot rod in the array. The rear ends of the pilot rods may be recessed to engage the front ends of said first-mentioned rods and the leading ends of said pilot rods may be tapered.

Said first-mentioned rods are preferably thrust into the frame in simultaneous groups corresponding to rows of rods in the array.

The present invention also provides apparatus suitable for inserting a plurality of rods into a frame which includes grids for locating said rods to form a parallel array by the aforesaid method, said apparatus comprising a plurality of roller pairs including grooves for locating a plurality of said rods between the rollers in a spaced parallel relationship corresponding to the spacing of a row of said rods when located in the frame, a thrust-head adapted to engage the rear ends of said rods when located between the roller pairs, means for propelling said thrust-head to cause axial movement of said rods, said rollers being resiliently mounted to allow passage of said thrust-head between said pairs, and a table for locating said frame, said table and said plurality of roller pairs being relatively moveable normal to the axis of said frame to allow alignment of a row of rods located between said roller pairs with each row of rod positions in the frame.

Preferably said thrust head comprises a plurality of resiliently mounted members each adapted to engage the rear end of a said rod, transducer means associated with each said member to pro an output signal corresponding to the thrust applied to each rod, and means controlled by said signals for interrupting the propulsion of the thrust-head if the thrust applied to any rod exceeds a predetermined value.

The apparatus may further comprise a means for loading said rods between said grooved roller pairs, said loading means comprising a support member arranged parallel to the rod axes when between the roller pairs, a plurality of members extending from said support member and having collinear grooves for carrying a row of rods spaced to correspond with the grooves of said roller pairs, means for moving said support member so that said grooved members can enter spaces between adjacent roller pairs and align their grooves with the roller grooves, means for separating the individual rollers of said roller pairs to allow passage of rods across the roller grooves, and means for moving said support ember vertically relative to said roller pairs to allow the deposition of a row of rods on the lower rollers of said separated roller pairs.

DESCRIPTION OF THE DRAWINGS

To enable the nature of the present invention to be more readily understood, attention is directed, by way of example, to the accompanying drawings wherein.

DESCRIPTION OF THE PREFERRED EMBODIMENT

Figure 1:
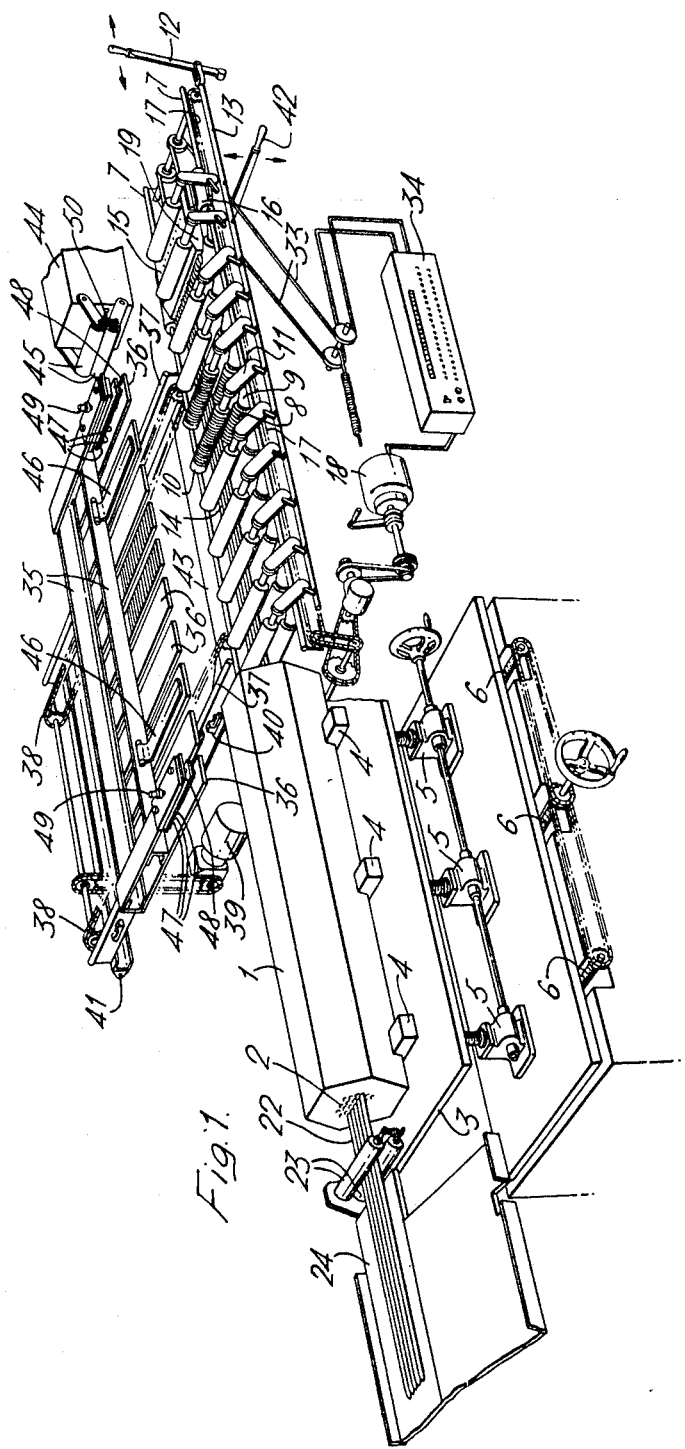
FIG. 1 is an isometric view, simplified for clarity, of apparatus embodying the present invention.

Referring to FIG. 1, there is shown a frame constituted by a hexagonal nuclear fuel wrapper 1 containing a plurality of locating grids. As explained in the introduction, approximately half of the wrapper contains spaced grids of the honeycomb form shown in British Pat No. 992,154 with locating projections on three walls of each hexagonal cell, and the other half abutting grids having large parallelogram-shaped cells. One of the honeycomb grids is indicated at 2, but this particular grid and a similar one at the other end of the wrapper (not shown) are inserted temporarily during the drilling operation to provide additional guidance and are afterwards removed.

The wrapper 1 is mounted on a table 3 provided with locating means, indicated at 4, to prevent lateral and axial movement of the wrapper on the table. The table can be moved vertically by means of jacks 5 and laterally, normal to the wrapper axis, by screws 6. The jacks and screws are operated by handwheels.

Arranged in line with table 3 is a rigid framework comprising two parallel rails 7. Mounted on these rails 7. Mounted on these rails are eleven roller pairs. The lower roller 8 of each pair is mounted on an arm 9 and is spring-loaded upwards against a stop (not shown) to a common defined level. The upper roller 10 of each pair is mounted on an arm 11 and is loaded by its own weight against the corresponding lower roller 8. The upper rollers 10 can be raised from the lower rollers 8 by a lever 12 via a rod 13 which engages the arms 11. All the upper and lower rollers have grooves adapted to locate between them the rodlike fuel pins 14 which it is desired to insert in wrapper 1, the spacing of the grooves corresponding to the spacing of each horizontal row of cells in the honeycomb locating grids. Only two roller pairs are shown as having grooves, for clarity.

Figure 2:
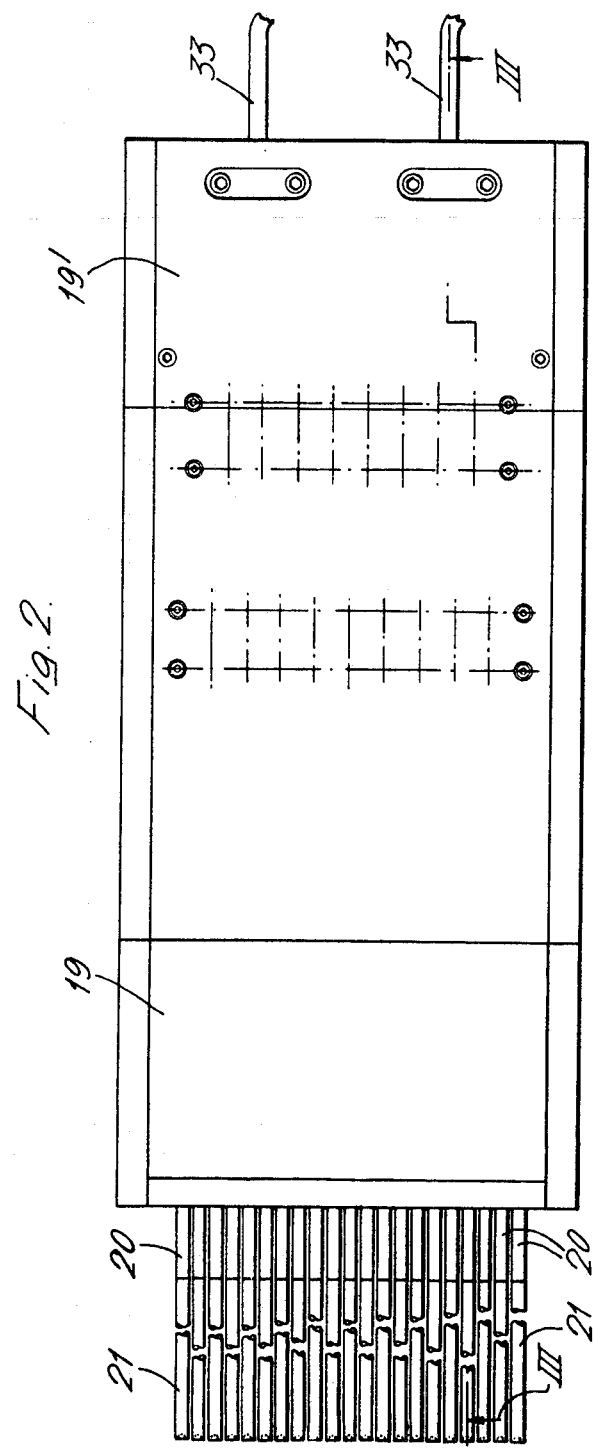
FIG. 2 is a plan view of the thrust-head shown in FIG. 1.
Figure 3:
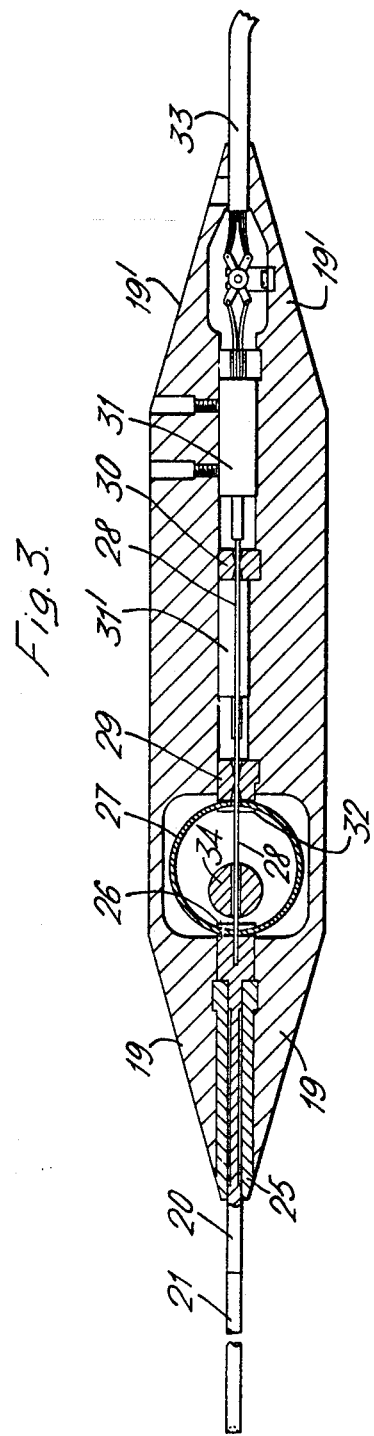
FIG. 3 is a sectional elevation of the line III—III of FIG. 2.

Mounted on the rails 7 is a thrust-head 15 fitted with runners 16 which engage the rails. The thrust-head is propelled along the rails by a chain 17 driven through a gear-train by a motor 18. The gear-train allows the head to be driven in either direction at will. The thrust-head, less runners, is shown in more detail in FIGS. 2 and 3. As FIG. 3 clearly shows, the profile of the head is bevelled at each end (the bevelled front end is indicated at 19 in FIG. 1). As the head is propelled along the rails, the upper and lower rollers, loaded as described, ride up the bevelled front end 19, along the flat top and bottom of the head, and down its bevelled rear end 19' (FIG. 3). The two roller-pairs nearest lever 12 are shown riding over head 15 in this manner, (FIG. 1).

Figure 4:
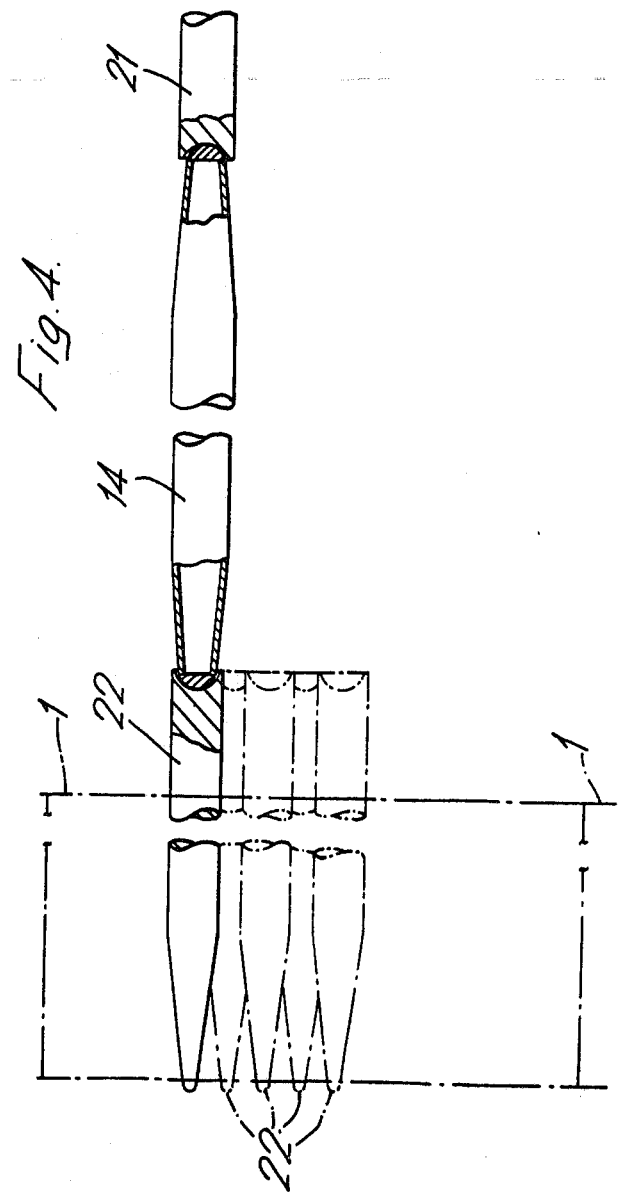
FIG. 4 is an elevation in partial section showing the engagement of a pilot rod with a fuel pin.

The front end of head 15 is provided with a plurality of thrust rods 20 which are collinear with the grooves in the rollers. Into the outer ends of these thrust rods are screwed a number of extension rods 21 (FIGS. 2 and 3) corresponding to the number of pins in the row of grid cells to be filled. The outer ends of the extension rods are recessed to engage the rounded rear ends of the fuel pins 14, (FIG. 4). FIG. 1 shows five fuel pins so engaged, out of a possible total of 21, as is shown in FIG. 2. (The row being filled in FIG. 1 clearly requires more than the five fuel pins shown to fill it, but the remainder have been omitted from the drawing for clarity.) The extension rods in excess of the number required to fill a given row are removed to allow those remaining to enter the wrapper 1 when the head is at the end of rails 7 nearest the wrapper.

In operation the number of pins 14 required to fill a given horizontal row of the grid-containing wrapper are loaded between the roller-pairs 8, 10 (by means to be described hereinafter), and the given row of grid cells is aligned with the front end of the pins by means of jacks 5 and screws 6. The thrust-head 15 is then propelled forward by motor 18 to thrust the pins into the wrapper, plenum end first, to a position predetermined by a limit-switch (not shown) on the forward movement of head 15. The head is then withdrawn, the roller-pairs reloaded with a further set of pins, and the next horizontal row of grid cells aligned with the pins. The latter are then thrust into the wrapper, and the sequence repeated to till the wrapper row by row.

In one example the fuel pins 14 are made of stainless steel tubing with a maximum outside diameter (fuel-containing portion) of only 0.23 inch, a minimum outside diameter (plenum portion) of 0.21 inch, and a wall thickness of only 15 thou, and are 8.5 ft. long. As explained in the introduction, these dimensions, together with the structure of grids within the wrapper, makes it difficult to insert the fuel pins in a linear manner, without pins crossing one another, entering the wrong cells, or striking the partitions between the cells.

This difficulty is overcome by first filling the wrapper with pilot rods 22 (FIGS. 1 and 4) which have a reduced diameter compared with the fuel pins, and tapered leading ends, to allow easy passage through the grids. The pilot rods are made of solid stainless steel rod 0.015 to 0.020 inch smaller in diameter than the minimum diameter of the fuel pins, and are slightly longer than the wrapper, though the latter is not essential. Being solid, they are stronger, more rigid, and easier to keep straight.

The rear ends of the pilot rods 22 are recessed (see FIG. 4) to engage the leading ends of the fuel pins 14, and as the latter are thrust in by head 15, the pilot rods are pushed out, piloting the fuel pins into their correct positions in the wrapper. To facilitate the alignment and engagement of the fuel pins with the pilot rods, the rear ends of the latter are left projecting a uniform short distance beyond the end of the wrapper after filling, as indicated in FIG. 4. The emerging pilot rods 22 (FIG. 1) pass between a pair of spring-loaded, nongrooved rollers 23, which serve to hold the pilot rods against the fuel pins and keep them in constant engagement, on to a table 24. The pilot rods emerge, row by row, as the fuel pins are thrust in.

As the pilot rods 24 are straight, robust, and not radioactive, their insertion into the wrapper presents little difficulty. It is preferably performed using a simple apparatus (not shown) in which the wrapper is mounted on a fixed table, a row of pilot rods is loaded between a plurality of roller pairs which only the lower rollers are grooved, and some of the lower rollers (coupled by gearing) are rotated manually to provide a forward friction drive for the rods into the wrapper. This roller assembly is mounted on a frame which is adjustable in height to align with successive rows of the grid cells. Lateral adjustment is provided by allowing axial movement of the rollers on their shafts.

In the event of a fuel pin jamming during insertion, or requiring an excess of force to insert it, it is important that the forward movement of the thrust-head 15 be stopped to prevent damage to the pin. Referring to FIG. 3, it will be seen that the thrust rods 20 are not fixed rigidly to the head, but slide in guides 25. The inner end of each rod is enlarged and has cheeks 26 which embrace a proving ring 27 acting as a spring. A thin rod 28, fastened into the end of rod 20, passes through diametrically opposite holes in ring 27, and via bushes 29 and 30 to a linear potentiometer transducer 31. The side of ring 27 opposite cheeks 26 is held between cheeks 32 of bush 29.

In operation the thrust applied to the fuel pins by rod 21 is resisted by ring 27, whose deflection, and hence the axial movement of rod 28, is a measure of the thrust. This movement is converted by transducer 31 to an electrical signal which is fed via cables 33 to a control unit 34. The latter indicates, by lighting lamps, whether the thrust applied to any pin exceeds a predetermined value, and also immediately stops the AC motor 18 in that event by injecting DC current into its windings.

There is a ring 27, a rod 28 and a transducer 31 associated with each rod 20, but because of the close spacing of the rods 20, successive transducers are staggered across the thrust head, as shown at 31'. Transverse rod 34, through which each rod 28 passes, acts as a stop to limit the axial movement of rods 20 and so prevent damage to the transducers or overloading of the proving rings 27.

FIG. 1 also shows a means for loading the fuel pins 14 between the roller pairs 8, 10. A support member 35 arranged parallel to pins 14 carries 10 horizontal members 36 extending therefrom. The 10 members 36 are provided with collinear grooves (FIG. 1 shows only two grooved members for clarity) corresponding in number and spacing with the grooves in rollers 8 and 10. The support member 35 is mounted on rails 37, along which it can be moved by chains 38 driven by motor 39. The members 36 are so spaced along support member 35 that as the latter is driven towards the roller pairs 8, 10, the members 36 enter the spaces between adjacent roller pairs. A limit switch 40 is arranged to stop movement of member 35 when the grooves in member 36 are in register with the roller grooves.

The rails 37 are pivoted at their rear ends as indicated at 41, and a pair of cams (not shown) controlled by lever 42 engage the undersurface of crossmember 43, enabling the level of the members 36 to be varied relative to the rollers.

In operation the fuel pins are delivered to the above-described apparatus in a shielding container represented schematically at 44. The pin-containing channels 50 in container 44 are aligned with the grooves in members 36 and the desired number of pins wound manually into these grooves by rotating friction rollers 45. This process is assisted by the hinged flaps 46, which bear on the pins and steady them to ensure correct location in the grooves. To check that the pins are correctly located in the grooves, without crossovers, microswitches 47 are mounted over the grooves of the two outside members 36, on arms 48. These arms can be raised and lowered pneumatically by compressed air supplied through pipes 49 to allow the microswitches to contact the pins. If the pins are located correctly, the two switches at the ends of each channel formed by the aligned grooves are operated, and this face is indicated on lamps (not shown). Mislocation results in the switch at only one end of a channel being closed, and as the two switches are wired in series, the indicating lamp will not light.

Assuming that the pins are correctly aligned on the members 36, lever 12 is operated to raise the upper rollers 10, and lever 42 to raise the rails 37. The member 35 is then driven towards the roller-pairs 8, 10, the pins carried by members 36 passing over the grooves in the lower rollers 8 as the members 36 enter the spaces between the roller-pairs. When the pins are aligned above the roller grooves, switch 40 stops further movement, and lever 42 is located to lower the pins into the grooves and leave the members 36 clear of the pins. The members 36 are then withdrawn by reversing motor 39 and the upper rollers 10 lowered on to the pins ready for their insertion into wrapper 1 to commence.

The radiation shielding provided around the apparatus, and in particular around the position of wrapper 1, is omitted for clarity in FIG. 1.

Arrangements other than that hereinbefore described can be used for loading the fuel pins 14 between the roller pairs 8, 10.

We claim:

1. A method of inserting a plurality of rods into a frame which includes grids for locating said rods to form a parallel array thereof, comprising firstly inserting into said frame a corresponding plurality of pilot rods, each pilot rod having a reduced cross-sectional dimension relative to said first-mentioned rods to allow easy passage through said grids and having a read end adapted to engage the front end of a said first-mentioned rod, and secondly engaging the rear ends of said pilot rods with the front ends of said first-mentioned rods and thrusting said first-mentioned rods into the frame so that each first-mentioned rod displaces a said pilot rod in the array.

2. A method as claimed in claim 1 wherein the rear ends of said pilot rods are recessed to engage the front ends of said first-mentioned rods.

3. A method as claimed in claim 1 wherein the leading ends of said pilot rods are tapered.

4. A method as claimed in claim 1 wherein said first-mentioned rods are thrust into the frame in simultaneous groups corresponding to rows of rods in the array.

5. A method as claimed in claim 1 wherein said first-mentioned rods are nuclear reactor fuel pins.